US007533060B2

(12) United States Patent
Hoyos et al.

(10) Patent No.: US 7,533,060 B2
(45) Date of Patent: May 12, 2009

(54) SYSTEM AND METHOD FOR OPTIMAL SELECTION OF PAYMENT AUTHORIZATIONS IN COMPLEX COMMERCE SYSTEMS

(75) Inventors: Carlos Antonio Lorenzo Hoyos, Morrisville, NC (US); Marcelo Perazolo, Cary, NC (US); Viswanath Srikanth, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 456 days.

(21) Appl. No.: 11/379,304

(22) Filed: Apr. 19, 2006

(65) Prior Publication Data

US 2007/0250443 A1    Oct. 25, 2007

(51) Int. Cl.
*G06Q 40/00* (2006.01)
(52) U.S. Cl. .......................................... 705/44; 705/35
(58) Field of Classification Search .............. 705/10–44
See application file for complete search history.

(56) References Cited

U.S. PATENT DOCUMENTS

| | | | | |
|---|---|---|---|---|
| 4,650,978 | A * | 3/1987 | Hudson et al. | 235/380 |
| 4,948,174 | A * | 8/1990 | Thomson et al. | 283/58 |
| 5,742,931 | A | 4/1998 | Spiegelhoff et al. | 705/8 |
| 6,016,504 | A | 1/2000 | Arnold et al. | 709/200 |
| 6,029,150 | A * | 2/2000 | Kravitz | 705/39 |
| 6,260,024 | B1 | 7/2001 | Shkedy | 705/37 |
| 6,532,450 | B1 * | 3/2003 | Brown et al. | 705/40 |
| 6,910,021 | B2 * | 6/2005 | Brown et al. | 705/40 |
| 6,932,268 | B1 * | 8/2005 | McCoy et al. | 235/380 |
| 7,177,836 | B1 * | 2/2007 | German et al. | 705/40 |
| 7,356,502 | B1 * | 4/2008 | LaBadie et al. | 705/38 |
| 2002/0069167 | A1 | 6/2002 | Conlow | 705/40 |
| 2003/0074264 | A1 | 4/2003 | Hoffman | 705/26 |

FOREIGN PATENT DOCUMENTS

WO    WO 00/23929    4/2000

OTHER PUBLICATIONS

Mann, Ronald J., "Regulating Internet Payment Intermediaries", Texax Law Review v82n3, pp. 681-716, Feb. 2004, Dialog file 15, Accession No. 02745034.*
"Streamlining cash management", Corporate Finance, pp. 32-33, Apr. 2003, ISSN: 0958-2053, JRNL Code: COF, Dialog file 15, Accession No. 02590059.*

* cited by examiner

*Primary Examiner*—Frantzy Poinvil
(74) *Attorney, Agent, or Firm*—Van Leeuwen & Van Leeuwen

(57) ABSTRACT

A system and method for optimal selection of payment authorization in a complex commerce system is presented. A commerce system uses an algorithm to select an optimum payment authorization for a particular payment deposit. The algorithm allows the commerce system to support multiple types of authorizations while minimizing the number of payment transactions if possible. The algorithm also handles payment instrument priority, sufficient authorization amount availability, and a selection of a favorable set of payment authorizations for which to apply the payment deposit. Once the algorithm selects an optimum payment authorization for a particular payment deposit, the commerce system applies the payment deposit towards the optimum payment authorization in order to receive funds from an external payment provider.

3 Claims, 8 Drawing Sheets

200

| AUTHORIZATION UNIT TABLE | | | | |
|---|---|---|---|---|
| Auth. # | Total Authorized | Amt. Remaining | User ID | Account |
| 42587 | $100 | $100 | ABC | 152 |
| 627456 | $58 | $24 | ABC | 153 |
| 14665 | $87 | $65 | DEF | 485 |
| 756225 | $380 | $300 | GHI | 470 |
| 859553 | $476 | $400 | JKL | 580 |

| RELEASE TABLE | | |
|---|---|---|
| Deposit # | Amount | User ID |
| D41 | $100 | ABC |
| D652 | $26 | DEF |
| D141 | $260 | JKL |

SYSTEM AND METHOD FOR OPTIMAL SELECTION OF PAYMENT AUTHORIZATIONS IN COMPLEX COMMERCE SYSTEMS

BACKGROUND OF THE INVENTION

1. Technical Field

The present invention relates to a system and method for optimal selection of payment authorizations in a complex commerce system. More particularly, the present invention relates to a system and method for optimally selecting a payment authorization using an algorithm along with commerce system rules, and applying a payment deposit to the selected payment authorization in order to receive funds for shipped goods.

2. Description of the Related Art

Online commerce has become a preferred method among consumers and businesses for purchasing goods. A typical online commerce system functions in three stages, which are an order capture stage, an order fulfillment stage, and a shipment stage. During the order capture stage, the online commerce system validates payment details and may verify that a customer has enough available funds for the order. At this stage, the online commerce system may also reserve a required amount of funds from an external payment provider by receiving a payment authorization.

When goods are available to fulfill all or part of an order, the order (or partial order) enters the order fulfillment stage, and the online commerce system releases the goods to a warehouse for shipment. If the online commerce system has not yet requested a payment authorization, the online commerce system may do so in the order fulfillment stage.

When the goods are ready to ship, the online commerce system creates a payment deposit equaling the value of the goods, and selects a payment authorization for which to apply the payment deposit in order to receive funds from the external payment provider. A challenge found is that when multiple payment authorizations exist for a particular customer, current online commerce systems do not have a well-defined approach for selecting the best payment authorization, especially when partial orders are shipped. The choice of the payment authorization has a direct bearing on the number of transactions required to process the payment for a given order.

In order to avoid facing the decision of which payment authorization to match with a payment deposit, many online commerce systems split an order into smaller orders. This approach, however, leads to complexities with discounts, promotions, and order processing issues. In addition, this approach may lead to the online commerce system requesting more payment authorizations from an external payment provider, which adds to cost. Furthermore, this approach becomes more complex when order releases include varying amounts and multiple payment methods.

What is needed, therefore, is a system and method for selecting an optimum payment authorization for applying a payment deposit in a complex commerce system.

SUMMARY

It has been discovered that the aforementioned challenges are resolved using a system and method for using an algorithm and commerce system rules to select an optimum payment authorization for a particular payment deposit. The algorithm allows the commerce system to support multiple types of authorizations while minimizing the number of payment transactions if possible. The algorithm also handles payment instrument priority, sufficient authorization amount availability, and a selection of a favorable set of payment authorizations for which to apply the payment deposit.

A commerce system receives an order from a user, which may include multiple order items, multiple payment methods, and multiple shipping addresses. For example, a nationwide company may order all of its supplies through a central office, which may include hundreds of order items (line items). In this example, the order may also include shipping addresses for each of its stores, and separate payment methods for each of its stores as well.

The commerce system sends a validation request to an external payment provider in order to validate the order's payment method (e.g., credit card number, corporate account number, etc.). The external payment provider responds by sending a validation back to the commerce system. In addition, the commerce system may send an authorization request to the external payment provider, which is a request to charge against the payment method. The authorization request may be sent at the time of payment method validation or at the time of order fulfillment. In turn, the external payment provider sends a payment authorization back to the commerce system.

When one or more of the order's order items are in stock and available to ship, the commerce system "releases" the order items to a warehouse. When the order items are ready to ship, the commerce system generates a "payment deposit" that includes a deposit amount equal to the value of the released order items. For example, five order items may be scheduled to ship to a particular address, and their total value is $100. In this example, the commerce system generates a payment deposit with a deposit amount of $100.

At this point, the commerce system identifies whether multiple payment deposits or a single payment deposit may be applied toward a single payment authorization. Once identified, the commerce system selects the appropriate type of algorithm. In one embodiment, when a merchant's commerce system supports, for a particular payment deposit, both multiple payment deposits per payment authorization and single payment deposits per payment authorization, the merchant's commerce system determines which algorithm to use for the payment deposit based upon particular decision criteria.

Once identified, the algorithm analyzes the payment authorizations and selects one of the payment authorizations as an optimum payment authorization for which to apply the payment deposit. In turn, the commerce system sends a funds request, which references the optimum payment authorization, to the external payment provider. As a result, the external payment provider sends funds to the commerce system and the merchant ships the goods to the user.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

FIG. 2A is an authorization unit table that includes payment authorizations;

FIG. 2B is a release table that includes releases for order items that have not yet shipped;

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1:
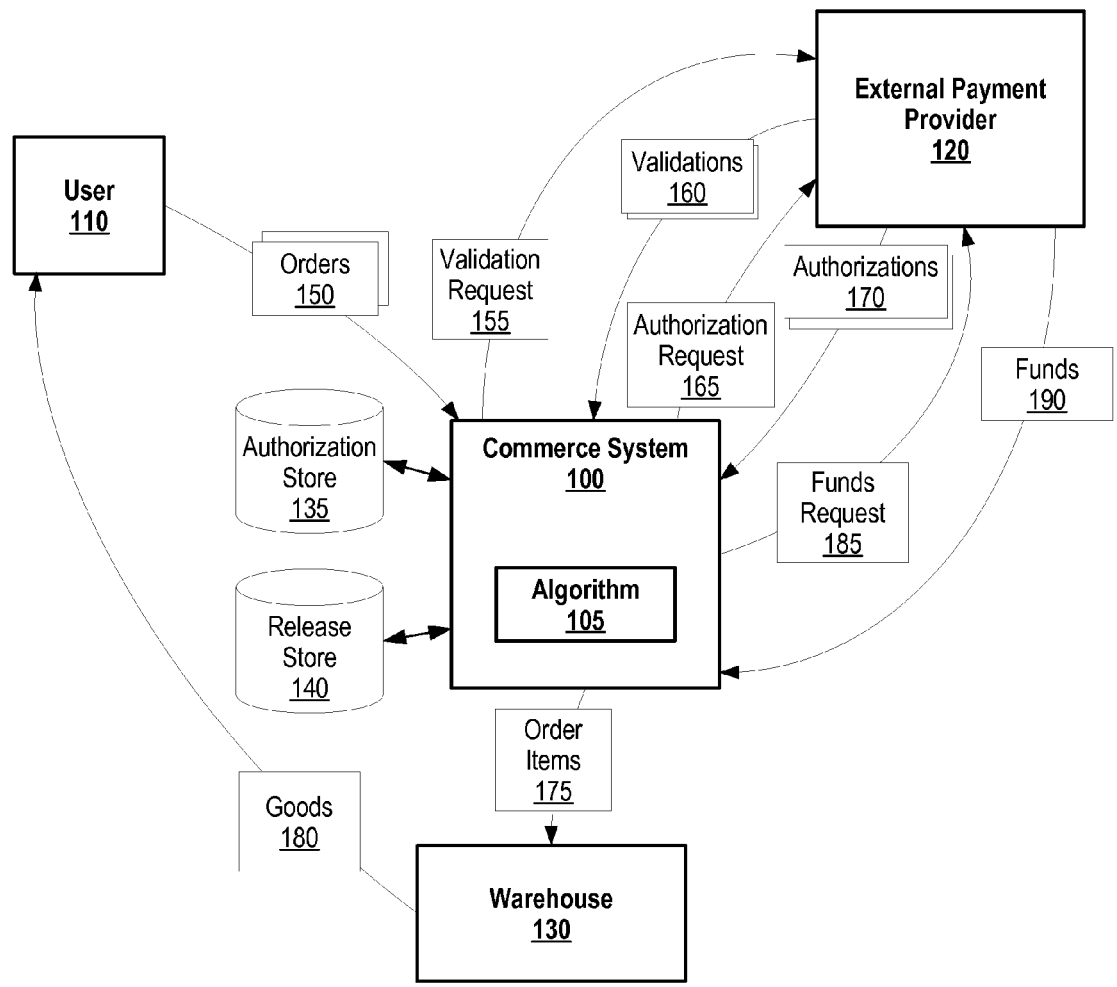
FIG. 1 is a diagram showing a commerce system using an algorithm to select an optimum payment authorization for which to apply a payment deposit.

FIG. 1 is a diagram showing a commerce system using an algorithm to select an optimum payment authorization for which to apply a payment deposit. A merchant uses commerce system 100 to manage customer orders and receive funds from an external payment provider based upon optimum payment authorizations. In turn, commerce system 100 requires less communication with external payment provider 120, and is also able to support multiple payment authorization types.

Commerce system 100 receives order 150 from user 110. User 110 may be a consumer placing an order over the Internet, or user 110 may be a business performing a business-to-business transaction. Order 150 may include multiple order items, multiple payment methods, and multiple shipping addresses. For example, a nationwide company may order all of its supplies through a central office, which may include hundreds of order items (line items). In this example, the order may also include shipping addresses for each of its stores, and separate payment methods for each of its stores as well.

Commerce system 100 sends validation request 155 to external payment provider 120 in order to validate order 150's payment method (e.g., credit card number, corporate account number, etc.). External payment provider 120 responds by sending validations 160 back to commerce system 100.

In addition, commerce system 100 sends authorization request 165 to external payment provider 120, which is a request to charge against the payment method. Authorization request 165 may be sent at the time of payment validation or at the time of order fulfillment. In turn, external payment provider 120 sends payment authorizations 170 back to commerce system 100, which commerce system 100 stores in authorization store 135.

When one or more of order 150's order items are in stock and available to ship, commerce system 100 "releases" the order items to warehouse 130 (order items 175), and stores release information in releases store 140. When the order items are ready to ship, commerce system 100 generates a "payment deposit" that includes a deposit amount equal to the value of the released order items. For example, five order items may be scheduled to ship to a particular address, and their total value is $100. In this example, commerce system 100 generates a payment deposit with a deposit amount of $100.

At this point, commerce system 100 uses algorithm 105 to select an optimum payment authorization from the payment authorizations stored in authorization store 135 for which to apply the payment deposit. Algorithm 105 allows commerce system 100 to support multiple types of authorizations while minimizing the number of payment transactions if possible. Algorithm 105 also handles payment instrument priority, sufficient authorization amount availability, and a selection of a favorable set of payment authorizations for which to apply the payment deposit. Commerce system 100 identifies whether multiple payment deposits or a single payment deposit may be applied toward a single payment authorization. Once identified, commerce system 100 selects the appropriate type of algorithm.

Figure 6:
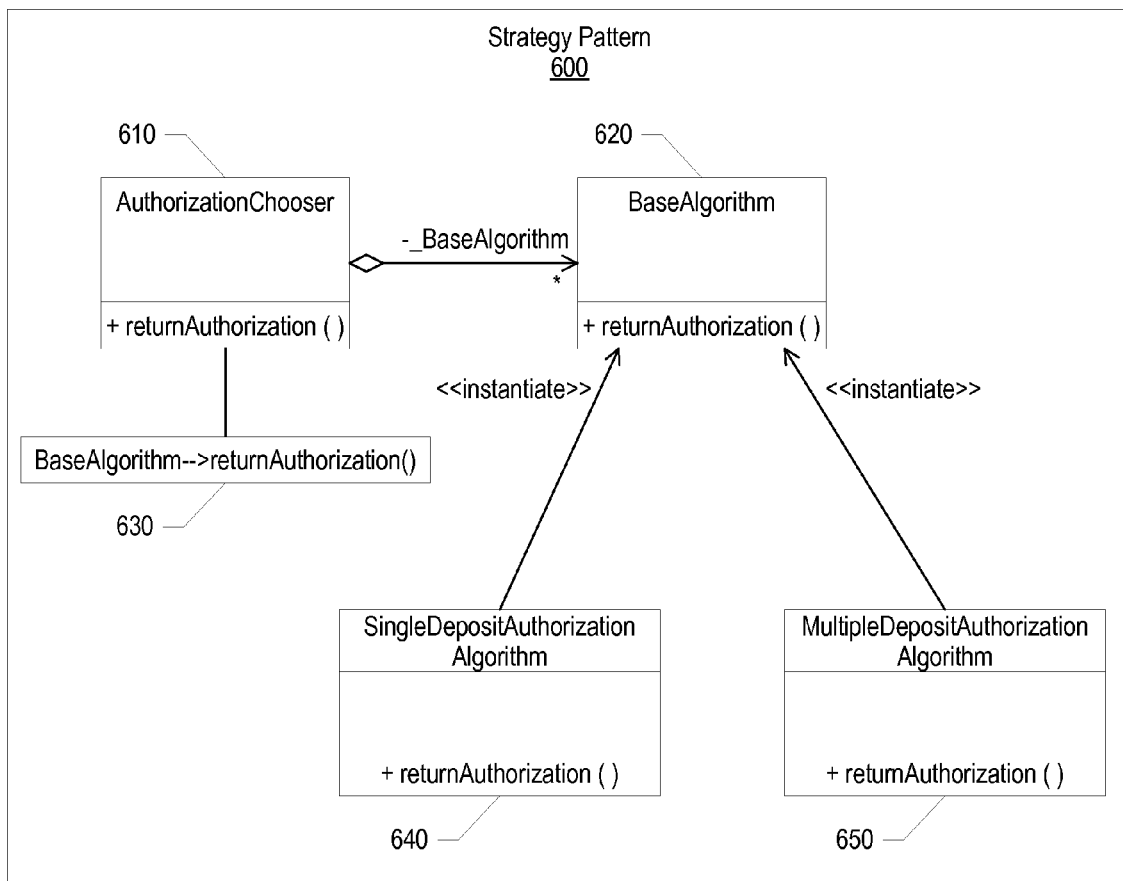
FIG. 6 is a strategy pattern that determines which algorithm to use when one payment deposit or multiple payment deposits may be applied to a single payment authorization.

In one embodiment, when a merchant's commerce system supports, for a particular payment deposit, both multiple payment deposits per payment authorization and single payment deposits per payment authorization, the merchant's commerce system determines which algorithm to use for the payment deposit based upon particular decision criteria (see FIG. 6 and corresponding text for further details).

Algorithm 105 analyzes the payment authorizations and selects one of the payment authorizations as an optimum payment authorization for which to apply the payment deposit (see FIGS. 3-7, and corresponding text for further details) . Once algorithm 105 selects the optimum payment authorization, commerce system 100 sends funds requests 185, which references the optimum payment authorization, to external payment provider 120. In turn, external payment provider 120 sends funds 190 to commerce system 100. In addition, warehouse 130 ships goods 180 to user 110, which includes order items 175 corresponding to the payment deposit.

FIG. 2A is an authorization unit table that includes payment authorizations. A commerce system uses table 200 to track payment authorizations in order to select one of the payment authorizations for which to apply a payment deposit.

Table 200 includes columns 210 through 250. Column 210 includes a list of authorization numbers for each payment authorization, which may be used as a reference when funds are requested from an external payment provider. Column 220 includes a list of authorization amounts for each of the payment authorizations. The authorization amount is the total amount of funds available for a particular payment authorization.

Column 230 includes a list of remaining authorization amounts for each of the payment authorizations. A payment authorization has a value in column 230 when the payment authorization is allowed to have multiple payment deposits applied towards the payment authorization. For example, a payment authorization may have an authorization amount of $100, and two payment deposits of $30 and $40 have been already applied towards the payment authorization. In this example, the payment authorization's remaining authorization amount is $30 ($100-$70).

Column 240 includes a list of user identifiers corresponding to the payment authorizations. The user identifiers may be a consumer's email address, or it may be a corporate account identifier. Column 250 includes a list of payment methods (e.g., accounts) for each of the payment authorizations. For example, one payment method may be a credit card number, and another payment method may be a debit card number.

FIG. 2B is a release table that includes releases for order items that have not yet shipped. A commerce system uses table 260 during the steps of determining which payment authorization to correspond with a payment deposit. During the analysis, the commerce system identifies releases in table 260, and flags payment authorizations that equal the values of one of the releases (see FIGS. 4, 5, and corresponding text for further details).

Table 260 includes columns 270 through 290. Column 270 includes a list of release numbers for each of the releases. Column 280 includes a list of release values for each of the releases, which the commerce system uses to determine which payment authorizations to flag during its optimum payment authorization analysis. And, column 290 includes a user identifier, similar to column 240 shown in FIG. 2A.

Figure 3:
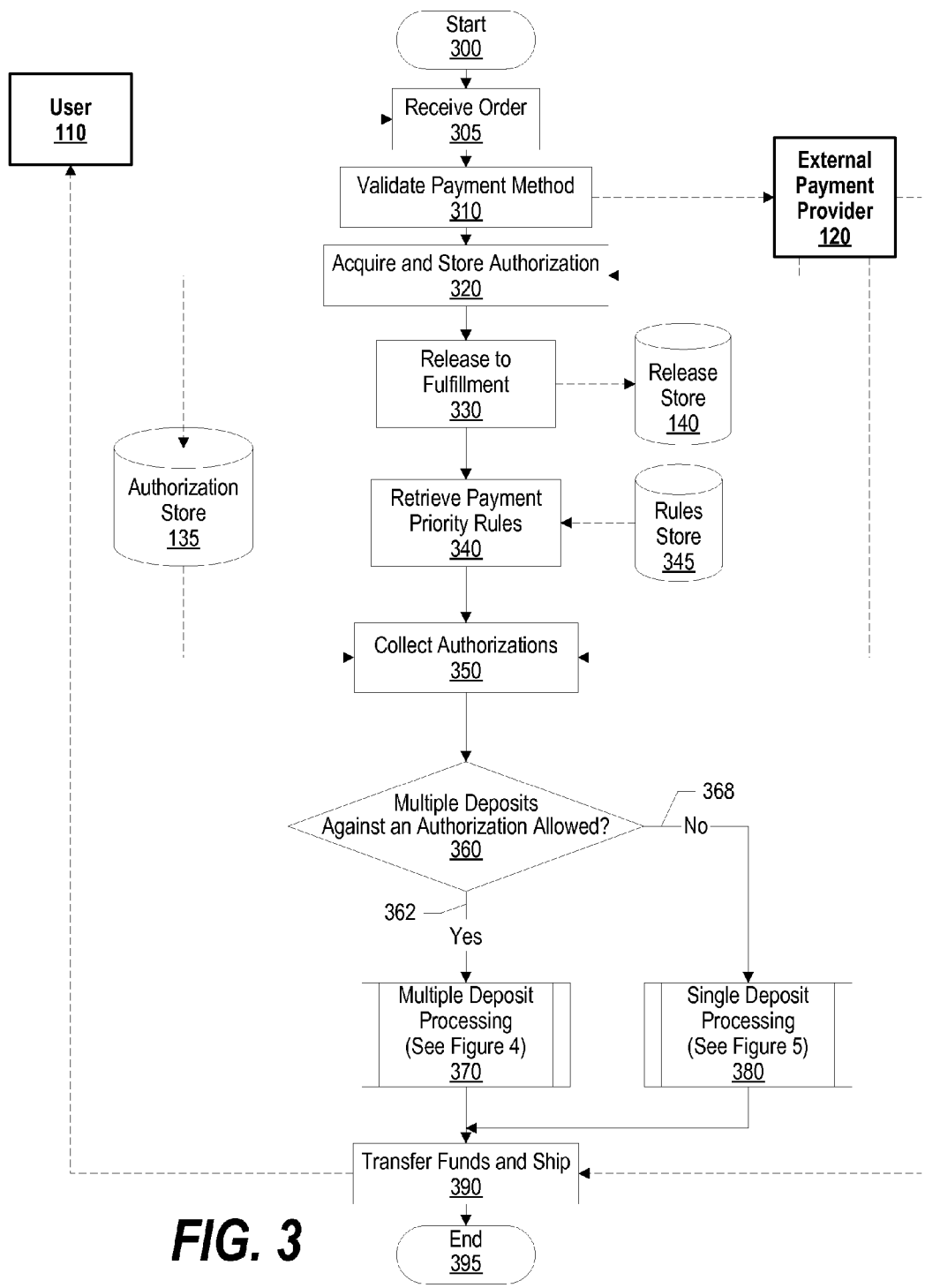
FIG. 3 is a high-level flowchart showing steps taken in selecting an optimum payment authorization and transferring funds using the optimum payment authorization.

FIG. 3 is a high-level flowchart showing steps taken in selecting an optimum payment authorization and transferring funds using the optimum payment authorization. Processing commences at 300, whereupon processing receives an order from user 110 at step 305. The order may include multiple order items (e.g., line items), multiple shipping addresses, and multiple payment methods. User 110 is the same as that shown in FIG. 1.

At step 310, processing validates the order's payment method with external payment provider 120. For example, the order may be paid with a credit card and, in this example, processing validates the credit card with external payment provider 120. In cases where the order includes multiple payment methods, processing may perform steps to validate each of the payment methods. At step 320, processing acquires a payment authorization from external payment provider 120, and stores the payment authorization in authorization store 135. Using the example described above, processing may receive an authorization number from external payment provider 120 that authorizes a merchant to collect funds up to a particular dollar amount. In one embodiment, a commerce system may not acquire a payment authorization until the commerce system releases an order, or part of an order, to fulfillment (step 350 discussed below). External payment provider 120 and authorization store 135 are the same as that shown in FIG. 1.

When processing identifies that one or more of the order's order items are in stock, processing generates a "release" (step 330) and stores the release in release store 140. For example, the order may include four order items and two of the four order items are in stock. In this example, processing generates a release for the two order items that are in stock. Release store 140 is the same as that shown in FIG. 1.

At step 340, processing retrieves payment priority rules from rules store 345. The payment priority rules are generated by a merchant, wherein the highest priority payment method establishes a first set of payment authorizations to evaluate. For example electronic checks typically have higher priority than credit cards due to credit cards having a slower validation process and delay in transfer of funds. Rules store 345 may be stored on a nonvolatile storage area, such as a computer hard drive.

Processing collects authorizations at step 350, which are the payment authorizations that are stored in authorization store 135, as well as additional payment authorizations from external payment provider 120. A determination is made as to whether multiple payment deposits may be applied towards a single payment authorization (decision 360). For example, a payment authorization may be received from payment provider for $100 that allows a merchant to receive funds in multiple increments as products are shipped. In another example, the payment authorization may allow a merchant to only receive funds one time for an authorization.

Figure 4:
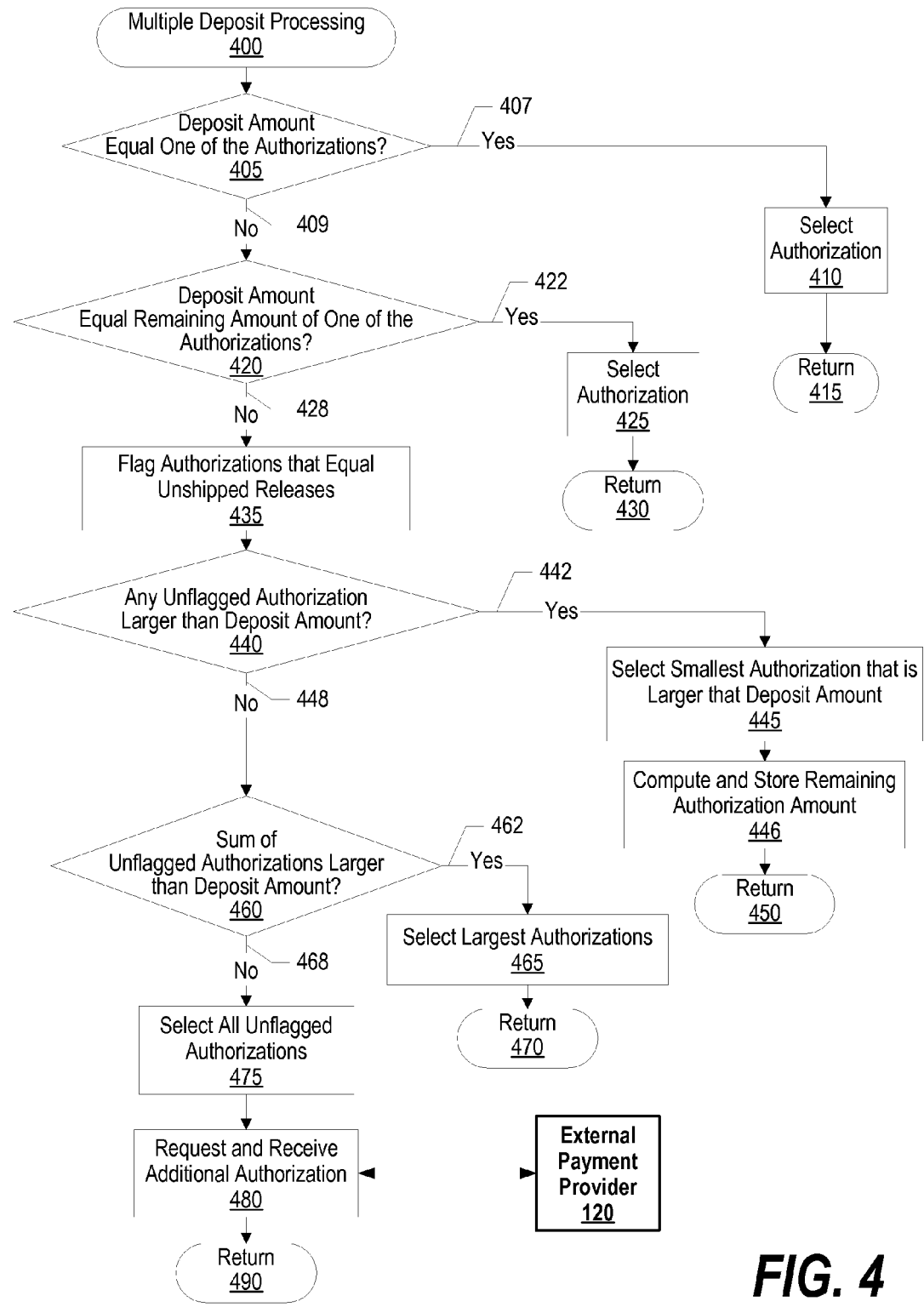
FIG. 4 is a flowchart showing steps taken in selecting an optimum payment authorization using a multiple deposit authorization algorithm.

If multiple payment deposits may be applied towards a single payment authorization, decision 360 branches to "Yes" branch 362 whereupon processing selects an optimum payment authorization using a multiple deposit authorization algorithm (pre-defined process block 370, see FIG. 4 and corresponding text for further details). On the other hand, if multiple payment deposits may not be applied towards a single payment authorization, decision 360 branches to "No" branch 368 whereupon processing selects an optimum payment authorization using a single deposit authorization algorithm (pre-defined process block 380, see FIG. 5 and corresponding text for further details).

At step 390, processing transfers funds from external payment provider 120 using the optimum payment authorization, and ships the order items to user 110. Processing ends at 395.

FIG. 4 is a flowchart showing steps taken in selecting an optimum payment authorization using a multiple deposit authorization algorithm. A commerce system compares a payment deposit's deposit amount one or more payment authorizations in order to select the appropriate payment authorization to apply to payment deposit.

Processing commences at 400, whereupon a determination is made as to whether the deposit amount equals one of the payment authorization's authorization amount (decision 405). For example, the deposit amount may be $10, and one of the authorization amounts is $10. In one embodiment, this determination may occur prior to determining whether multiple payment deposits may be applied towards a single payment authorization as discussed in FIG. 3, decision 360.

If the deposit amount equals one of the authorization amounts, decision 405 branches to "Yes" branch 407 whereupon processing selects the corresponding authorization as an optimum payment authorization (step 410), and returns at 415. On the other hand, if the deposit amount does not equal one of the authorization amounts, decision 405 branches to "No" branch 409.

A determination is made as to whether the deposit amount equals a remaining authorization amount of one of the payment authorizations (decision 420). For example, a payment authorization may have an original authorization amount of $100, and $30 has already been charged against the payment authorization. In this example, the payment authorization has a remaining authorization amount of $70. If the deposit amount equals a remaining authorization amount of one of the payment authorizations, decision 420 branches to "Yes" branch 422 whereupon processing selects the corresponding payment authorization as an optimum payment authorization (step 425), and returns at 430. On the other hand, if the deposit amount does not equal one of the remaining authorization amounts, decision 420 branches to "No" branch 428.

At step 435, processing flags payment authorizations that equal unshipped release values. For example, a merchant may have a $50 order item that has been released, but has not yet shipped. In this example, if a payment authorization exists that corresponds to a $50 authorization amount, processing flags the payment authorization, which prohibits it from being used during this stage of the analysis (see FIG. 7 and corresponding text for further details).

A determination is made as to whether any unflagged payment authorization's authorization amount is larger than the deposit amount (decision 440). If any remaining authorization amounts are larger than the deposit amount, decision 440 branches to "Yes" branch 442. At step 445, processing selects the payment authorization that corresponds to the unflagged payment authorization that has the smallest authorization amount, but is larger than the deposit amount. For example, of the deposit amount is $50, and unflagged payment authorizations include authorization amounts of $30, $60, $80, and $90, processing selects the payment authorization with an authorization amount of $60 because it the smallest amount of the authorization amounts that is larger than the deposit amount. At step 446, processing computes and stores a remaining authorization amount, which is the difference between the authorization amount and the deposit amount. Processing returns at 450.

On the other hand, if any unflagged payment authorizations do not have authorization amounts that are larger than the deposit amount, decision 440 branches to "No" branch 448 whereupon a determination is made as to whether the summation of the payment authorizations' authorization amounts are larger than the deposit amount (decision 460). If the summation of the authorization amounts is larger than the deposit amounts, decision 460 branches to "Yes" branch 462 whereupon processing selects the payment authorizations with the largest authorization value (step 465), and processing returns at 470. For example, if the deposit amount is $50 and the unflagged authorization amounts are $30, $20, $10, and $5, processing selects the payment authorizations corresponding to $30 and $20 to cover the $50 deposit amount because they have the largest authorization amounts.

On the other hand, if the summation of the authorization amounts is not larger than the deposit amounts, decision 460 branches to "No" branch 468 whereupon processing selects all of the unflagged payment authorizations (step 475), requests an additional payment authorization from external payment provider 120 at step 480, and returns at 490. Processing may perform multiple iterations of the steps shown in FIG. 4 until each deposit request is satisfied. External payment provider 120 is the same as that shown in FIG. 1.

Figure 5:
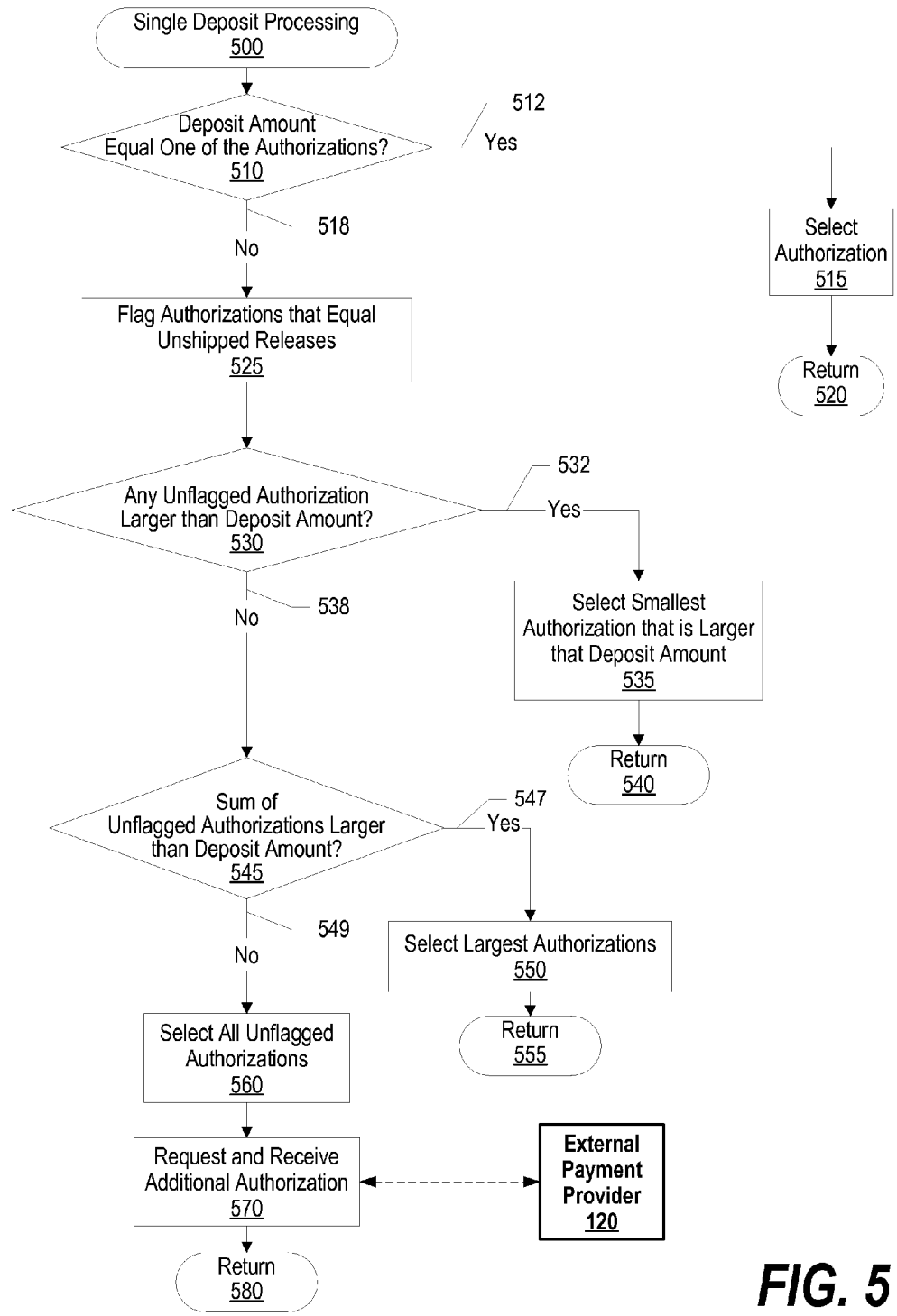
FIG. 5 is a flowchart showing steps taken in selecting an optimum payment authorization using a single deposit authorization algorithm.

FIG. 5 is a flowchart showing steps taken in selecting an optimum payment authorization using a single deposit authorization algorithm. The steps in determining an optimum payment authorization shown in FIG. 5 are similar to steps shown in FIG. 4 with the exception of FIG. 4's steps relating to "remaining authorization amounts."

Processing commences at 500, whereupon a determination is made as to whether the deposit amount equals one of the payment authorization's authorization amount (decision 510). Again, in one embodiment, this determination may occur prior to determining whether multiple payment deposits may be applied towards a single payment authorization as discussed in FIG. 3, decision 360. If the deposit amount equals one of the authorization amounts, decision 510 branches to "Yes" branch 512 whereupon processing selects the corresponding payment authorization as an optimum payment authorization (step 515), and returns at 520. On the other hand, if the deposit amount does not equal one of the authorization amounts, decision 510 branches to "No" branch 518.

At step 525, processing flags payment authorizations whose authorization amounts equal unshipped release values. A determination is made as to whether any unflagged payment authorizations have authorization amounts that are larger than the deposit amount (decision 530). If any unflagged authorization amounts are larger than the deposit amount, decision 530 branches to "Yes" branch 532 whereupon processing selects the payment authorization that corresponds to the authorization amount that is the smallest amount and is also larger than the deposit amount (step 535). Processing returns at 540.

On the other hand, if no unflagged payment authorizations have authorization amounts that are larger than the deposit amount, decision 530 branches to "No" branch 538 whereupon a determination is made as to whether the summation of the payment authorizations' authorization amounts is larger than the deposit amount (decision 545).

If the summation of the authorization amounts is larger than the deposit amounts, decision 545 branches to "Yes" branch 547 whereupon processing selects the payment authorizations with the largest authorization value as discussed in FIG. 4 (step 550). Processing returns at 555.

On the other hand, if the summation of the authorization amounts is not larger than the deposit amounts, decision 545 branches to "No" branch 549 whereupon processing selects all the payment authorizations (step 560), requests an additional payment authorization from external payment provider 120 at step 570, and returns at 580. Processing may perform multiple iterations of the steps shown in FIG. 5 until each deposit request is satisfied. External payment provider 120 is the same as that shown in FIG. 1.

FIG. 6 is a strategy pattern that determines which algorithm to use when one payment deposit or multiple payment deposits may be applied to a single payment authorization. Since some merchant payment methods may support multiple payment deposits per payment authorization, while others may not, the merchant's commerce system may use strategy pattern 600 to determine whether to use a single deposit authorization algorithm or a multiple deposit authorization algorithm for a particular payment deposit.

Strategy pattern 600 includes algorithm factory 610, algorithm interface 620, code snippet 630, and algorithms 640-650. Algorithm factory 610 creates the correct algorithm implementation (algorithm 640 or algorithm 650) given specific properties of the payment method. Algorithm interface 620 defines the protocol that the implementation hierarchy follows. And, code snippet 630 demonstrates how the actual implementation returns the correct algorithm through the use of well-known, object-oriented polymorphism technique.

A merchant's commerce system separates payment authorizations that support multiple payment deposits, and those that only support a single payment deposit. Then, the commerce system instantiates SingleDepositAuthorizationAlgorithm 640 to identify the number of payment authorizations required to satisfy the payment deposit. Likewise, the commerce system instantiates MultipleDepositAuthorizationAlgorithm 650 to identify the number of payment authorizations required to satisfy the payment deposit. In one embodiment, algorithms 640 and 650 may run at the same time.

Once both algorithms identify the number of payment authorizations required to satisfy the payment deposit, the commerce system may follow a series of decision criteria to select the appropriate algorithm. In one embodiment, the decision criteria may be:

1. Select the algorithm that results in a lesser number of transactions.
2. Select the algorithm whose resulting authorization amount is closer to the deposit amount.
3. Select the single deposit authorization algorithm.

Figure 7:
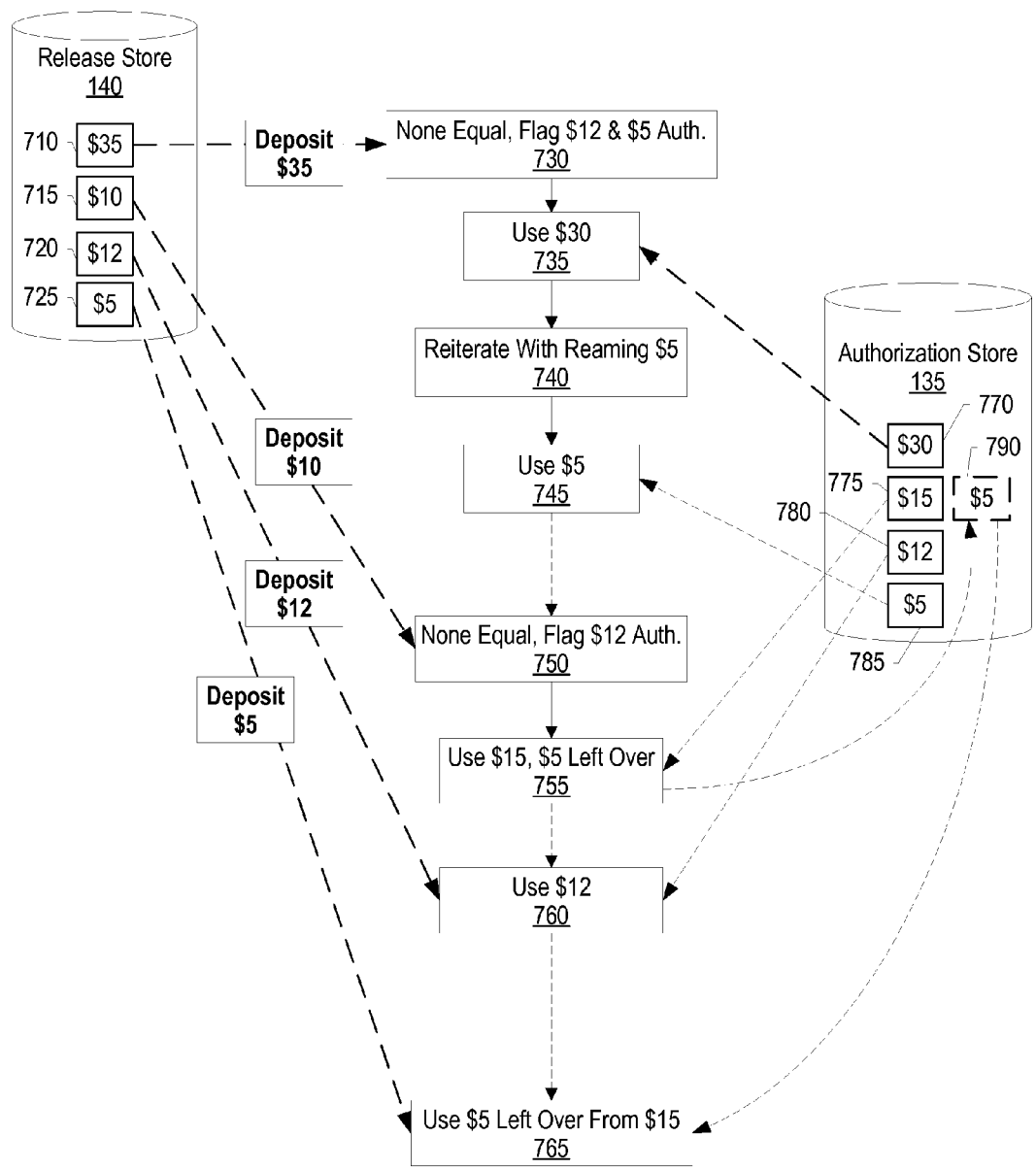
FIG. 7 is a diagram showing a commerce system selecting optimum payment authorizations based upon available payment authorizations and unshipped releases.

FIG. 7 is a diagram showing a commerce system selecting optimum payment authorizations based upon available payment authorizations and unshipped releases. The commerce system stores unshipped releases in release store 140, which is the same as that shown in FIG. 1. Unshipped releases correspond to order items that are in stock, have been released to fulfill, but have not yet shipped. Release store 140 includes unshipped releases 710, 715, 720, and 725, which have respective values of $35, $10, $12, and $5. In addition, the commerce system stores payment authorizations in authorization store 135, which is the same as that shown in FIG. 1. Authorization store 135 originally has payment authorizations 770, 775, 780, and 785, which have respective authorization amounts of $30, $15, $12, and $5.

The first release to evaluate is release 710. At 730, the commerce system determines that none of payment authorizations 770 through 785 equal $35, but payment authorization 780 and 785 equal releases 720 and 725, respectively. As such, payment authorizations 780 and 785 are flagged and not used during this stage of the analysis.

At 735, the commerce system selects payment authorization 770, which leaves $5 of the payment deposit left to fulfill. At 740, the commerce system clears the flags of the payment authorizations and reiterates its analysis using the $5 remaining to be fulfilled. At 745, the commerce system selects payment authorization 785 because it equals the $5 remaining to be fulfilled.

The next release to evaluate is release 715. At 750, the commerce system determines that neither payment authorization 770 nor 780 equals $10, but payment authorization 780 equals release 720. As such, payment authorizations 780 is flagged and not used during this stage of the analysis. At 755, the commerce system uses payment authorization 775, resulting in a remainder of $5 ($15-$10), which is stored as remaining authorization amount 790 in authorization store 135.

The next release to evaluate is release 720. At 760, the commerce system determines that payment authorization 780 equals $12 and, therefore, selects payment authorization 780 to correspond with release 720. Finally, the last release to evaluate is release 725. At 765, the commerce system determines that remaining authorization amount 790 equals $5 and, therefore, selects remaining authorization amount 790 to correspond with release 725.

Figure 8:
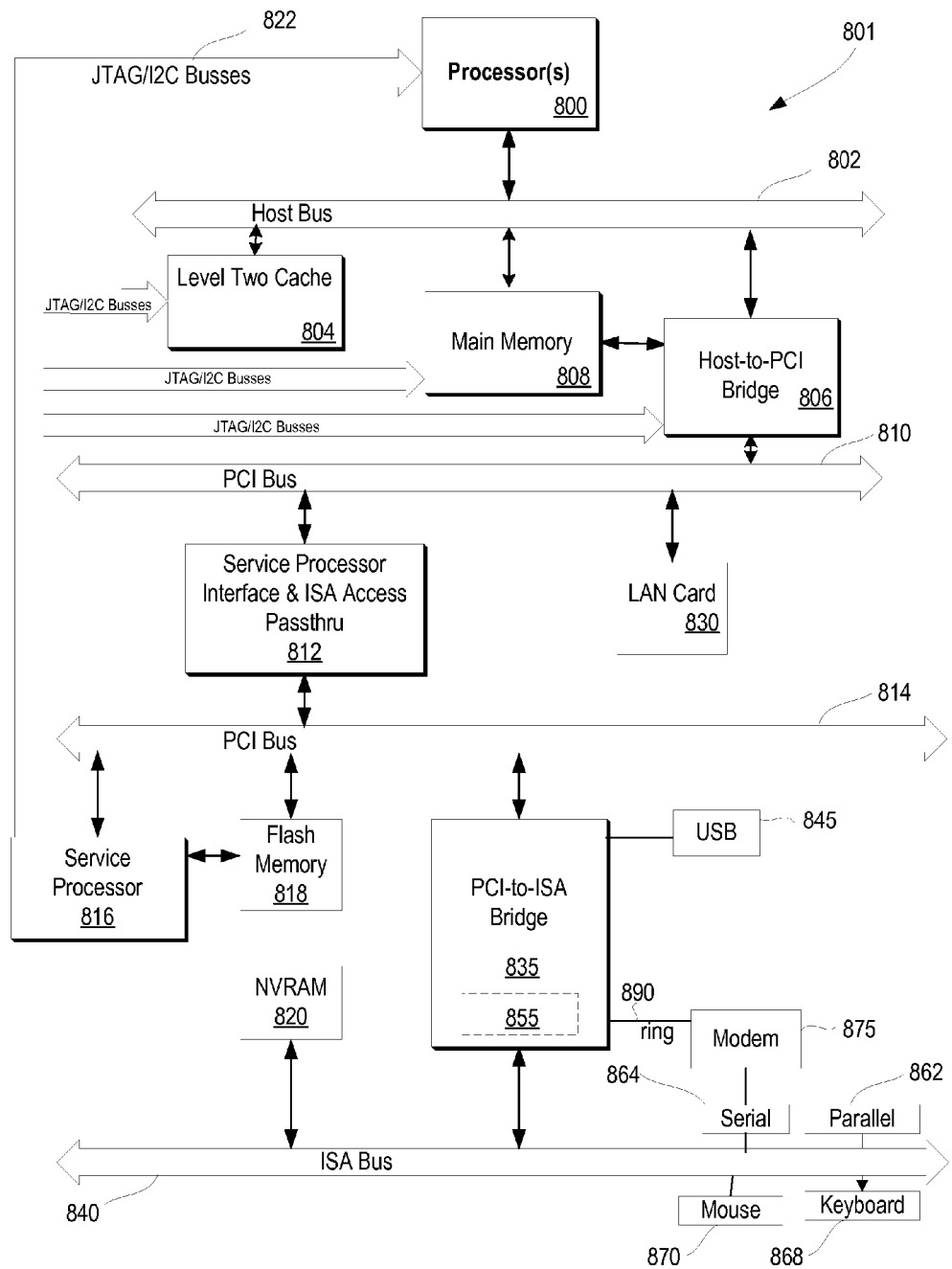
FIG. 8 is a block diagram of a computing device capable of implementing the present invention.

FIG. 8 illustrates information handling system 801 which is a simplified example of a computer system capable of performing the computing operations described herein. Computer system 801 includes processor 800 which is coupled to host bus 802. A level two (L2) cache memory 804 is also coupled to host bus 802. Host-to-PCI bridge 806 is coupled to main memory 808, includes cache memory and main memory control functions, and provides bus control to handle transfers among PCI bus 810, processor 800, L2 cache 804, main memory 808, and host bus 802. Main memory 808 is coupled to Host-to-PCI bridge 806 as well as host bus 802. Devices used solely by host processor(s) 800, such as LAN card 830, are coupled to PCI bus 810. Service Processor Interface and ISA Access Pass-through 812 provides an interface between PCI bus 810 and PCI bus 814. In this manner, PCI bus 814 is insulated from PCI bus 810. Devices, such as flash memory 818, are coupled to PCI bus 814. In one implementation, flash memory 818 includes BIOS code that incorporates the necessary processor executable code for a variety of low-level system functions and system boot functions.

PCI bus 814 provides an interface for a variety of devices that are shared by host processor(s) 800 and Service Processor 816 including, for example, flash memory 818. PCI-to-ISA bridge 835 provides bus control to handle transfers between PCI bus 814 and ISA bus 840, universal serial bus (USB) functionality 845, power management functionality 855, and can include other functional elements not shown, such as a real-time clock (RTC), DMA control, interrupt support, and system management bus support. Nonvolatile RAM 820 is attached to ISA Bus 840. Service Processor 816 includes JTAG and I2C busses 822 for communication with processor(s) 800 during initialization steps. JTAG/I2C busses 822 are also coupled to L2 cache 804, Host-to-PCI bridge 806, and main memory 808 providing a communications path between the processor, the Service Processor, the L2 cache, the Host-to-PCI bridge, and the main memory. Service Processor 816 also has access to system power resources for powering down information handling device 801.

Peripheral devices and input/output (I/O) devices can be attached to various interfaces (e.g., parallel interface 862, serial interface 864, keyboard interface 868, and mouse interface 870 coupled to ISA bus 840. Alternatively, many I/O devices can be accommodated by a super I/O controller (not shown) attached to ISA bus 840.

In order to attach computer system 801 to another computer system to copy files over a network, LAN card 830 is coupled to PCI bus 810. Similarly, to connect computer system 801 to an ISP to connect to the Internet using a telephone line connection, modem 885 is connected to serial port 864 and PCI-to-ISA Bridge 835.

While FIG. 8 shows one information handling system that employs processor(s) 800, the information handling system may take many forms. For example, information handling system 801 may take the form of a desktop, server, portable, laptop, notebook, or other form factor computer or data processing system. Information handling system 801 may also take other form factors such as a personal digital assistant (PDA), a gaming device, ATM machine, a portable telephone device, a communication device or other devices that include a processor and memory.

One of the preferred implementations of the invention is a client application, namely, a set of instructions (program code) in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method comprising:
    receiving, by a commerce system, an order that includes one or more order items, wherein a plurality of payment authorizations that correspond to the order are received from one or more external payment providers;
    acquiring the plurality of payment authorizations that correspond to the order, wherein each of the plurality of authorizations includes an authorization amount;
    creating a payment deposit that corresponds to shipping one or more of the order items, the payment deposit including a deposit amount;
    in response to determining that the deposit amount does not equal one of the authorization amounts, determining whether a plurality of payment deposits are allowed to be applied to one of the plurality of payment authorizations;
    in response to determining that the plurality of payment deposits are allowed to be applied to one of the payment authorizations, determining whether one of the authorizations includes a remaining authorization amount that equals the deposit amount;
    selecting, by a processor included in the commerce system, an optimum payment authorization for which to apply the payment deposit, the optimum payment authorization included in the plurality of payment authorizations, wherein the selecting results in minimizing a number of payment transactions to one or more of the external payment providers wherein, and wherein the selecting is performed based upon determining that the optimum payment authorization corresponds to the remaining authorization amount that equals the deposit amount; and
    transferring funds corresponding to the deposit amount based upon the optimum payment authorization.

2. A computer program product stored on a computer operable media, the computer operable media containing instructions for execution by a computer, which, when executed by the computer, cause the computer to implement a method for payment authorization selection, the method comprising:
    receiving an order that includes one or more order items, wherein a plurality of payment authorizations that correspond to the order are received from one or more external payment providers;
    acquiring the plurality of payment authorizations that correspond to the order, wherein each of the plurality of authorizations includes an authorization amount;
    creating a payment deposit that corresponds to shipping one or more of the order items, the payment deposit including a deposit amount;
    in response to determining that the deposit amount does not equal one of the authorization amounts, determining whether a plurality of payment deposits are allowed to be applied to one of the plurality of payment authorizations;
    in response to determining that the plurality of payment deposits are allowed to be applied to one of the payment authorizations, determining whether one of the authorizations includes a remaining authorization amount that equals the deposit amount;
    selecting an optimum payment authorization for which to apply the payment deposit, the optimum payment authorization included in the plurality of payment authorizations, wherein the selecting results in minimizing a number of payment transactions to one or more of the external payment providers wherein, and
    wherein the selecting is performed based upon determining that the optimum payment authorization corresponds to the remaining authorization amount that equals the deposit amount; and
    transferring funds corresponding to the deposit amount based upon the optimum payment authorization.

3. An information handling system comprising:
    one or more processors;
    a memory accessible by the processors;
    one or more nonvolatile storage devices accessible by the processors; and
    a payment authorization selection tool for selecting an optimum payment authorization, the payment authorization selection tool comprising software code executed by the processors to perform steps comprising:
        receiving an order over a computer network, wherein the order includes one or more order items, wherein a plurality of payment authorizations that correspond to the order are received from one or more external payment providers;
        acquiring a plurality of payment authorizations over the computer network, wherein the payment authorizations correspond to the order, wherein each of the plurality of authorizations includes an authorization amount;
        creating a payment deposit that corresponds to shipping one or more of the order items, the payment deposit including a deposit amount;
        in response to determining that the deposit amount does not equal one of the authorization amounts, determining whether a plurality of payment deposits are allowed to be applied to one of the plurality of payment authorizations;
        in response to determining that the plurality of payment deposits are allowed to be applied to one of the payment authorizations, determining whether one of the authorizations includes a remaining authorization amount that equals the deposit amount;
        selecting an optimum payment authorization included in one of the nonvolatile storage devices for which to apply the payment deposit, the optimum payment authorization included in the plurality of payment authorizations, wherein the selecting results in minimizing a number of payment transactions to one or more of the external payment providers wherein, and wherein the selecting is performed based upon determining that the optimum payment authorization corresponds to the remaining authorization amount that equals the deposit amount; and
        transferring transfer funds over the computer network corresponding to the deposit amount based upon the optimum payment authorization.

* * * * *